United States Patent
Kim et al.

(10) Patent No.: US 6,628,236 B2
(45) Date of Patent: Sep. 30, 2003

(54) ISOTROPIC ANTENNA SYSTEM AND NOTEBOOK COMPUTER

(75) Inventors: Young-eil Kim, Yongin (KR); Jae-yul Lee, Suwon (KR); Seong-soo Lee, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 09/794,959

(22) Filed: Mar. 1, 2001

(65) Prior Publication Data

US 2001/0052878 A1 Dec. 20, 2001

(30) Foreign Application Priority Data

May 31, 2000 (KR) ........................................ 2000-29568

(51) Int. Cl.[7] .................................................. H01Q 1/24
(52) U.S. Cl. .......................................... 343/702; 455/90
(58) Field of Search ................................. 343/702, 715, 343/751, 793, 879, 700 MS; 455/562, 90, 575; H01Q 1/24

(56) References Cited

U.S. PATENT DOCUMENTS

| 5,966,098 | A | * | 10/1999 | Qi et al. ...................... 343/702 |
| 6,031,503 | A | * | 2/2000 | Preiss et al. ................. 343/702 |
| 6,167,312 | A | * | 12/2000 | Goedeke ....................... 607/32 |
| 6,181,284 | B1 | * | 1/2001 | Madsen et al. ............. 343/702 |
| 6,285,328 | B1 | * | 9/2001 | Masaki et al. .............. 343/702 |
| 6,295,462 | B1 | * | 9/2001 | Kudoh ......................... 343/702 |
| 6,336,037 | B1 | * | 1/2002 | Sekine et al. ............... 343/702 |
| 6,339,400 | B1 | * | 1/2002 | Flint et al. .................. 343/702 |
| 6,424,303 | B1 | * | 7/2002 | Tsai ............................ 343/702 |

* cited by examiner

Primary Examiner—Don Wong
Assistant Examiner—Trinh Vo Dinh
(74) Attorney, Agent, or Firm—Sughrue Mion, PLLC

(57) ABSTRACT

An isotropic antenna system includes a first antenna for transmitting/receiving electric waves when a cover member installed to be capable of being open or closed with respect to a main body is open, a second antenna for transmitting/receiving electric waves when the cover member is closed, and a switch for selectively switching at least one of the first and second antennas to a predetermined RF circuit module according to the opening or closing of the cover member.

7 Claims, 8 Drawing Sheets

ISOTROPIC ANTENNA SYSTEM AND NOTEBOOK COMPUTER

BACKGROUND OF THE INVENTION

1. Field of the Invention

The present invention relates to an isotropic antenna system and a notebook computer adopting the same.

2. Description of the Related Art

Figure 1:
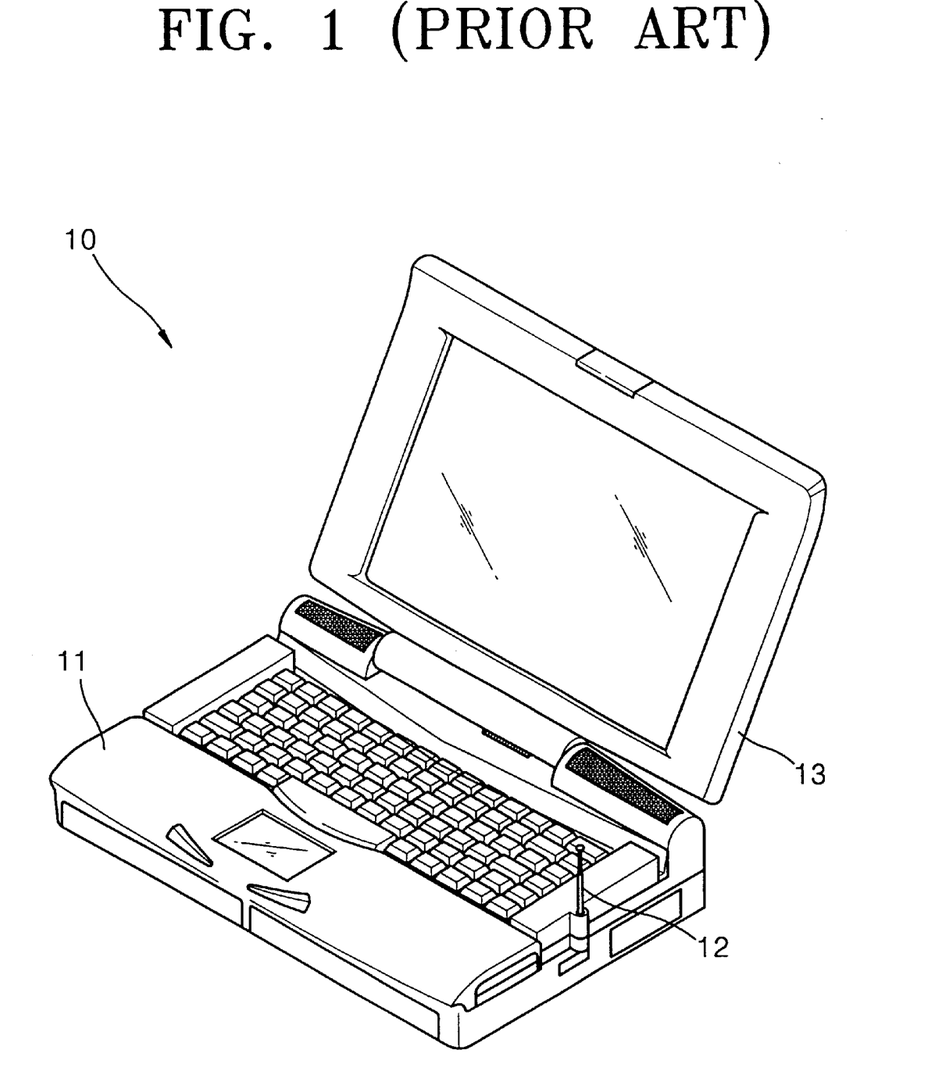
FIG. 1 is a perspective view showing a typical notebook computer.

In general, an antenna is necessarily provided to a portable notebook computer having a wireless communication function. Thus, a conventional dipole antenna is fixedly or detachably installed at the notebook computer. That is, as shown in FIG. 1, an antenna 12 is installed at a main body 11 of a notebook computer 10 to enable wireless communication. Also, the antenna 12 can be detached from the main body 11 and kept separately, as necessary, when the notebook is carried to another place and the antenna 12 is inconvenient. The antenna 12 emits electric waves into space by receiving an RF signal from a predetermined RF circuit module, which is for one-to-one communication between designated ports. Thus, the antenna 12 installed at the main body 11 hardly needs to have an isotropic property (i.e., that transmitting/receiving sensitivity is uniform in all directions), but needs only a degree of alignment to an access point and a particular port.

Meanwhile, active studies have been underway with the goal of realizing a so-called BLUETOOTH networking for connecting general desktop PCs, notebook PCs, printers, mobile phones and servers by near wireless communications. To realize the BLUETOOTH networking, each apparatus should be provided with an antenna and the antenna should be isotropic. That is, the uniform transmitting/receiving sensitivity should be maintained in all directions regardless of a position.

However, in the case of a notebook computer as shown in FIG. 1, when an LCD case 13 is open in the main body 1, radio waves are blocked by the LCD case 13 so that communication sensitivity with respect to the side opposite of the LCD case 13 is lowered. In particular, since the LCD case 13 is mostly metal-plated to shield against EMI (electromagnetic interference), the communication sensitivity is further degraded.

Also, a typical antenna for wireless communications such as the antenna 12 uses vertically polarized waves. When, the notebook computer 10 is carried by being vertically kept in a case, the vertically polarized waves are not received so that communications may be stopped.

Figure 2A:
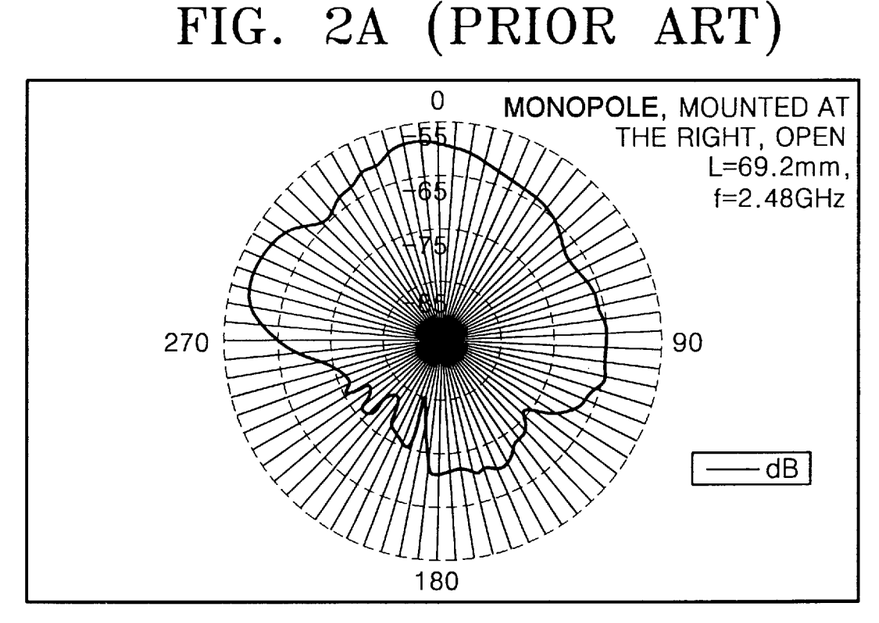
FIGS. 2A through 2C are views showing the results of experiments of a gain pattern of an antenna in the state in which the cover is open as shown in FIG. 1.
Figure 2B:
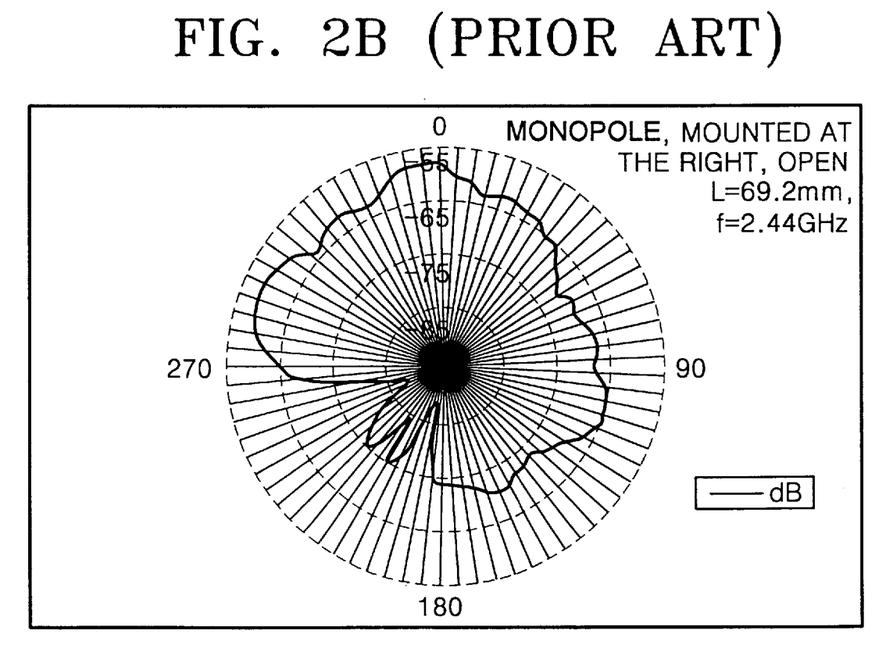
Figure 2C:
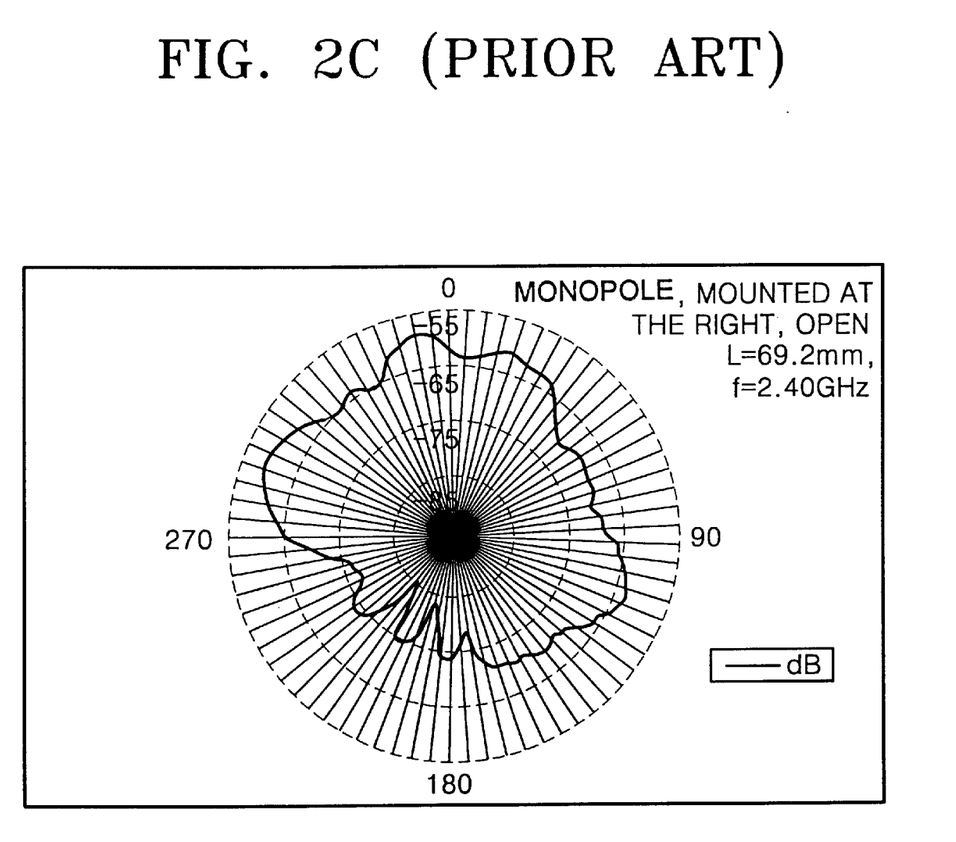
Figure 3A:
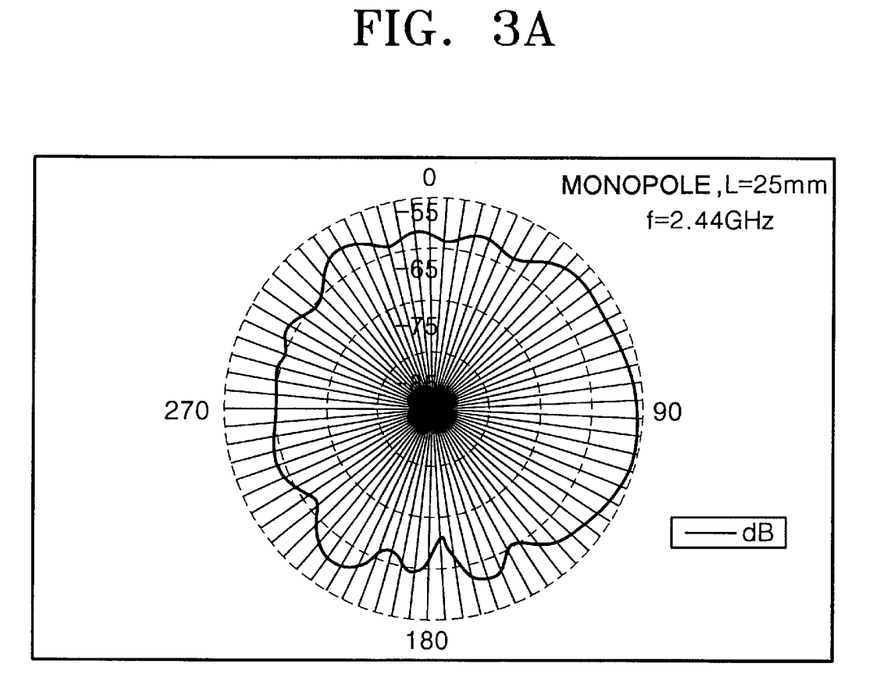
FIGS. 3A through 3C are views the results of experiments of a gain pattern of an antenna when an antenna is installed at the LCD case in the state of FIG. 1.
Figure 3B:
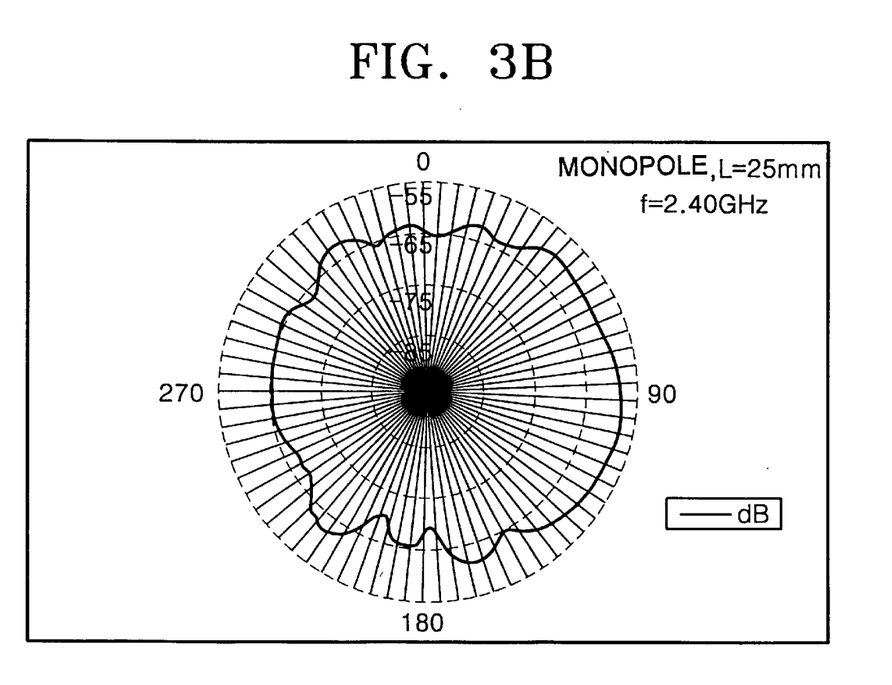
Figure 3C:
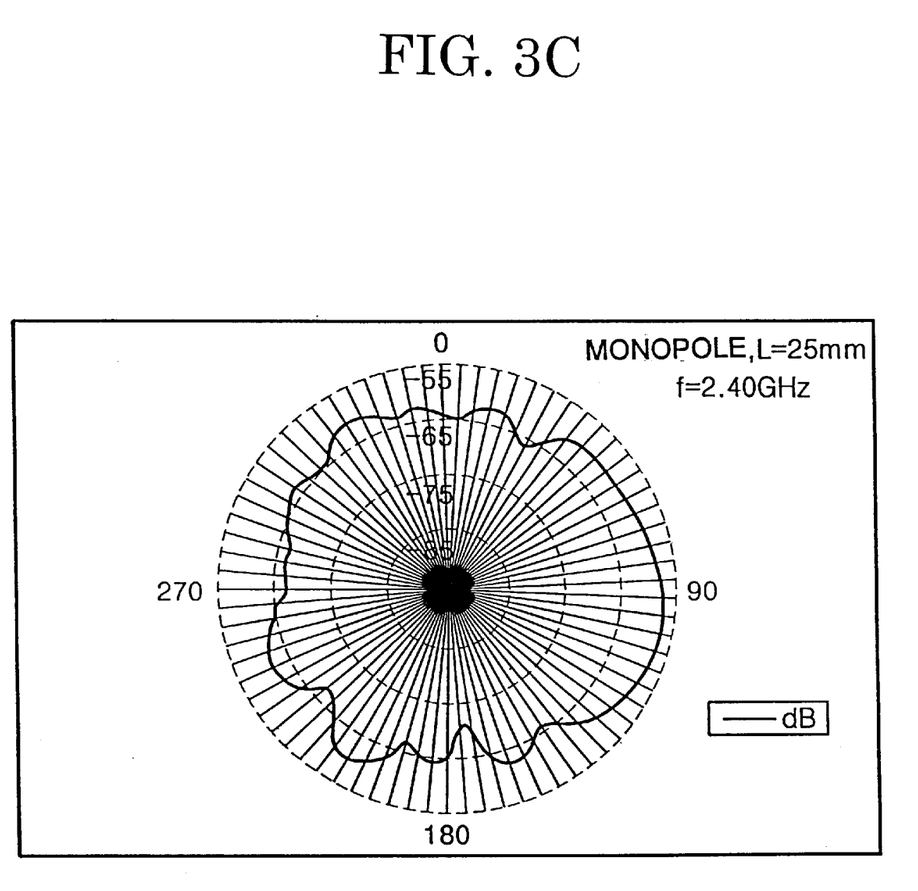

Such a problem can be seen in detail through experiments of a gain pattern of an antenna. FIGS. 2A through 2C are graphs showing the results of experiments of a gain pattern of an antenna when the antenna 12 is installed at one side of the main body 11 and the LCD case 13 is open. FIGS. 3A through 3C are graphs showing the results of experiments of a gain patten of an antenna when the antenna is installed at the LCD case 13. Here, in the drawings, L denotes the length of a dipole antenna, and f denotes the frequency of the electromagnetic waves. That is, comparing FIGS. 2A through 2C with FIGS. 3A through 3C, it can be seen that the difference in the gain pattern of the antenna becomes wider according to the installation position of the antenna. Also, it can be seen that the difference in the gain pattern of the antenna becomes much wider according to the opening/closing state of the LCD case. Thus, an antenna system which can obtain a uniform gain pattern of an antenna in all directions regardless of opening of the LCD case is needed.

SUMMARY OF THE INVENTION

To solve the above problem, it is an objective of the present invention to provide an antenna system which is improved to have an isotropic property by having a plurality of antennas, and a notebook computer adopting the same.

Accordingly, to achieve the above objective, there is provided an isotropic antenna system comprising a first antenna for transmitting and receiving electric waves when a cover member installed to be capable of being open or closed with respect to a main body is open, a second antenna for transmitting/receiving electric waves when the cover member is closed, and a switch for selectively switching at least one of the first and second antennas to a predetermined RF circuit module according to the opening or closing of the cover member.

It is preferred in the present invention that the isotropic antenna system further comprises a sensor installed at the main body or cover member for detecting information on the opening/closing of the cover member, and a controlling portion for controlling a connection state of the switch with respect to the first and second antennas according to the information on the opening/closing of the cover member output from the sensor.

Also, it is preferred in the present invention that the isotropic antenna system further comprises a switch button capable of elastically protruding or retreating as the cover member is open or closed so that the first antenna or the second antenna can be connected to the switch.

Also, to achieve another aspect of the above objective, there is provided a notebook computer comprising a computer main body in which an input device is installed, a display member, installed at the computer main body to be capable of being opened or closed, for displaying an image, a first antenna, installed at the display member, for transmitting/receiving electric waves, a second antenna, installed at the computer main body or the display member, for transmitting/receiving electric waves, and a switch for selectively switching at least one of the first and second antennas to a predetermined RF circuit module according to the opening or closing of the cover member, wherein the electric waves can be transmitted/received through at least one antenna regardless of the opening/closing of the display member.

BRIEF DESCRIPTION OF THE DRAWINGS

The above objective and advantages of the present invention will become more apparent by describing in detail preferred embodiments thereof with reference to the attached drawings in which.

DETAILED DESCRIPTION OF THE INVENTION

Figure 4:
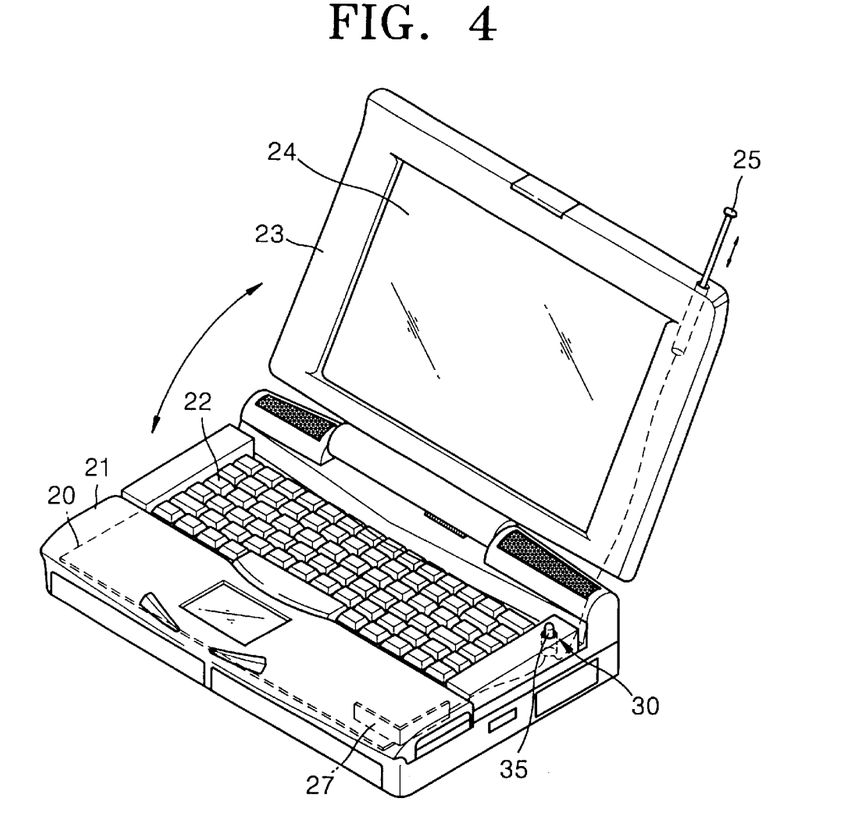
FIG. 4 is a perspective view showing a notebook computer to which an isotropic antenna system according to a preferred embodiment of the present invention is applied.

Referring to FIG. 4, an antenna system according to a preferred embodiment of the present invention and a notebook computer adopting the antenna system includes a computer main body 21, a cover member 23 installed at the main body 21 to cover the main body 21 so that the notebook computer can be open or closed, first and second antennas 25 and 27, and a switch 30.

Here, an input device including a keyboard 22 is installed at the computer main body 21, and a circuit board 20 and a CPU (not shown) and a CD-ROM (not shown) are is installed therein. The cover member 23 may be a display member for not only opening or closing the main body 21 but also displaying an image, which will be referred to as a display member 23. The display member 23 includes an LCD panel 24 which displays image data transmitted from the main body 21. The display member 23 is hinge-coupled to one side of the main body 21 so that the main body including the keyboard 22 can be open or closed.

The first antenna 25 is installed at the display member 23 to transmit/receive electric waves when the display member 23 is open. Thus, the first antenna 25 is preferably a dipole antenna which can transmit/receive vertically polarized waves and make a right angle with respect to the main body 21 when the display member 23 is open. Also, the first antenna 25 may be a retractable antenna installed to be manually or automatically extended or retractable from or to the display member 23. Since the technology to realize the retractable antenna is a well known technology concerning an antenna adopted in a typical mobile phone, a detailed description thereof will be omitted.

The second antenna 27 is installed at the main body 21, and preferably, a flat antenna installed on the circuit board 20 in the main body 21. Also, the second antenna 27 may be a planar antenna on the circuit board 20, for example, a slot antenna, a strip line antenna or a reverse L-shaped antenna. The second antenna 27 is provided to transmit/receive electric waves when the display member 23 covers the main body 21. Thus, the second antenna can be an antenna emitting linear polarized waves or circular polarized waves.

Figure 5:
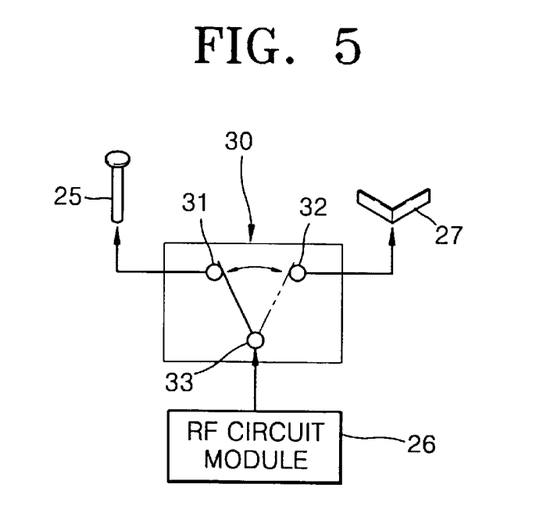
FIG. 5 is a view for explaining the structure of a switch of FIG. 4 according to a preferred embodiment of the present invention.

Referring to FIG. 5, in the switch 30, connection terminals 31 and 32 of the first and second antennas 25 and 27 are selectively connected to a predetermined RF circuit module 26 installed in the main body 21 to selectively drive the first antenna 25 or the second antenna 27 according to whether the display member 23 is open or closed. The switch 30 is manually turned on/off by the opening/closing action of the display member 23 to be selectively connected to each of the connection terminals 31 and 32.

As an example, since a switch button 35 is elastically installed on the upper surface of the main body 21, the switch button 35 can protrude or retreat as the display member 23 is open or closed. Thus, when the switch button 35 protrudes, as shown in the drawing, the connection terminal 31 of the first antenna is connected to the electricity supply terminal 33 of the RF circuit module 26. When the switch button 35 is pressed by the display member 23, the electricity supply terminal 33 is connected to the connection terminal 32 of the second antenna 27.

When wireless communications is performed by using the notebook computer having the above structure, in the state in which the display member 23 is open as shown in FIG. 4, the first antenna 25 is driven. Here, since being installed at the display member 23 unlike in the conventional technology, the first antenna 25 can have an isotropic property having uniform transmitting/receiving, sensitivity in all directions without the electric wave interference by the display member 23. Thus, at any positions, wireless communications with other computers, servers and printers can be smoothly made. When the notebook computer is not in use and is kept or carried, the notebook computer is maintained in a state in which transmission/receiving of electric waves between the apparatuses is possible so that data transmission such as exchange of e-mails between the apparatuses can be possible.

When the display member 23 is covered, the switch button 35 of FIG. 4 is pressed. Thus, the second antenna 27 and the RF circuit module 26 is connected and the first antenna 25 is disconnected. When the display member 23 is closed so that the function of the first antenna 25 transmitting the vertically polarized wave is lost, the second antenna 27 in the main body 21 is driven to compensate therefor. Also, when the notebook computer is kept or carried in a bag, the second antenna 27 can appropriately compensate for the lowering of function of the first antenna 25 due to various postures. Also, since the first and second antennas 25 and 27 can be built in the display member 23 and the main body 21, the antennas 25 and 27 can be prevented form being damaged.

Figure 6:
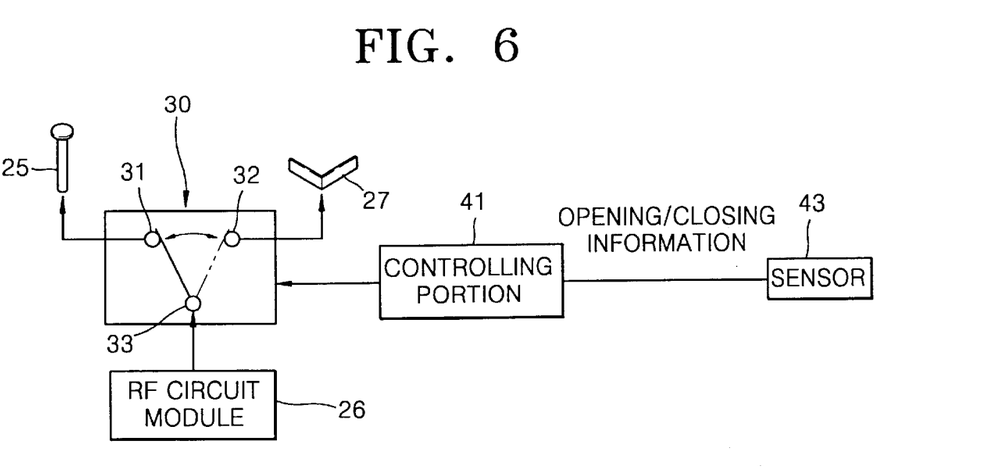
FIG. 6 is a view for explaining the structure of a switch of FIG. 5 according to another preferred embodiment of the present invention.

In another preferred embodiment as shown in FIG. 6, a switching action of the switch 30 can be configured to be automatically controlled by the controlling portion 41. In this case, a sensor 43 is provided for providing information to the controlling portion as to whether the display member 23 has been open or closed. This information may be referred to as the opening state of the cover with respect to the main body. The opening state may be a closed state, or the opening state may be an open state. The sensor 43 can be installed at the main body 21 and/or display member 23, and may include a general light emitting/receiving sensor which is widely used.

Figure 7:
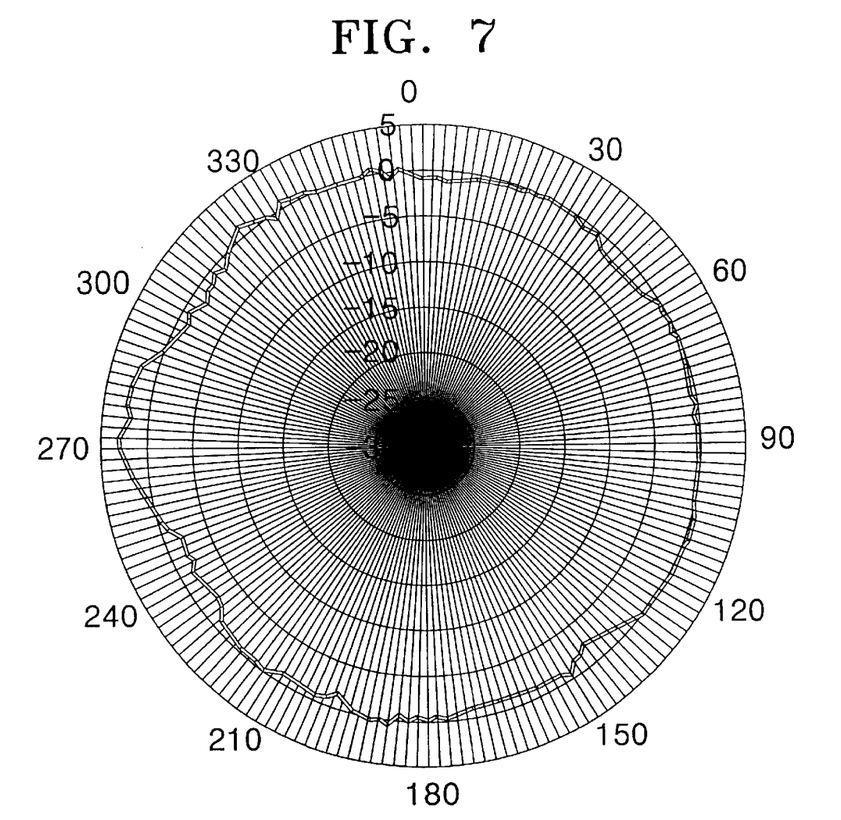
FIG. 7 is a graph showing a gain patten of a first antenna when the display member is open in the notebook computer of FIG. 4.

In this case, the sensor 43 detects the information as to whether the display member 23 is open or closed, and the controlling portion 41 receiving the detected information controls the switch 30. Thus, the RF circuit module 26 is automatically and selectively connected to the first and second antennas 25 and 27 according to the opening of the display member 23. As a result, an antenna having a superior transmitting/receiving sensitivity is automatically selected according to the opening state of the display member 23. Consequently, a shown in FIG. 7, an isotropic antenna having a uniform gain pattern with respect to all directions can be obtained. Here, FIG. 7 is a graph showing the results of the experiments of a gain pattern of the first antenna 25 in the state in which the display member 23 is open.

Figure 8:
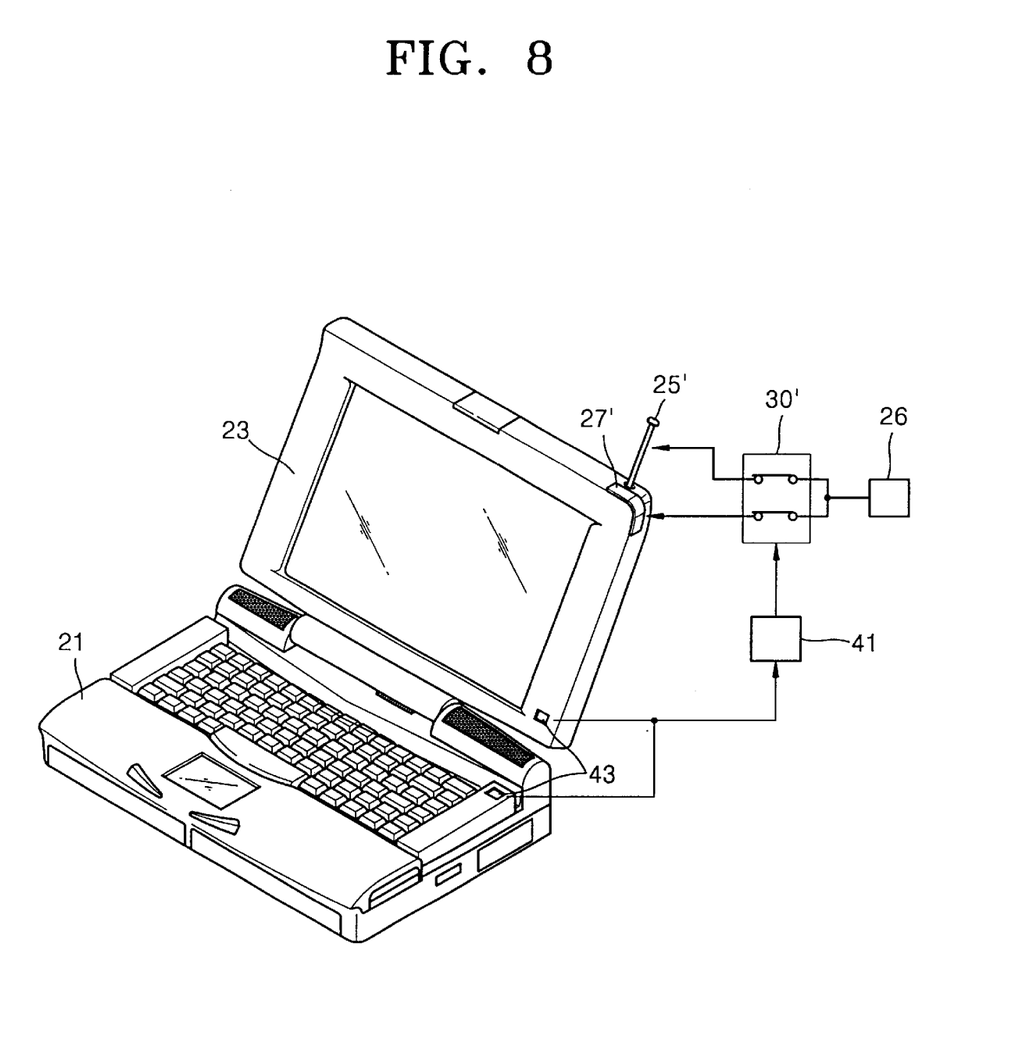
FIG. 8 is a perspective view showing a notebook computer according to another preferred embodiment of the present invention.

Also, as shown in FIG. 8, a first antenna 25' and a second antenna 27' can be installed at the display member 23. Also, both the first and second antennas 25' and 27', or either the first antenna 25' or the second antennas 27', can be driven by being connected to the RF circuit module 26 by a switch 30'. In this case, the sensor 43 is installed between the display member 23 and the main body 21. The switch 30' is controlled by the controlling portion 41 according to the opening/closing information received from the sensor 43. In this case, since the first and second antennas 25' and 27' can be concurrently driven, a transmitting/receiving efficiency is improved.

Also, although not shown in the drawing, it is obvious that, when the display member 23 is open or closed, the first and second antennas 25' and 27' can be manually turned on/off by using the switch button 35 as shown in FIG. 4.

As described above, according to the isotropic antenna system and the notebook computer according to the present invention, since two independent antennas are installed and selectively driven according to the posture of the display member which is open or closed with respect to the main body, uniform transmitting/receiving sensitivity in all directions can be obtained.

Thus, regardless of the posture or position of the notebook, wireless communications between apparatuses are possible so that reliability in wireless data communication can be improved. In particular, the antenna system and the notebook computer according to the present invention are a technology useful for the BLUETOOTH networking, and can help realize and develop the BLUETOOTH networking.

What is claimed is:

1. An isotropic antenna system comprising:
    a computer having a cover member, a main body, a first antenna, a second antenna, an RF circuit module, and a switch;
    said first antenna being mounted on said cover member;
    said second antenna being mounted on said computer at one of said cover member and said main body;
    said switch selectively switching at least one of the first and second antennas to operably connect to the RF circuit module based on an opening state of said cover member of said computer with respect to said main body;
    a sensor detecting said opening state of the cover member; and
    a controlling portion controlling a connection state of the switch with respect to the first and second antennas according to said detected opening state.

2. The system as claimed in claim 1, wherein:
    the first antenna is a dipole antenna, and
    said cover member is adapted so that said first antenna is movable from a position with a tip of said first antenna protruding above said cover member to a position with the tip not protruding above said cover member.

3. The system as claimed in claim 1, wherein the second antenna is a planar antenna installed in the main body.

4. A notebook computer comprising:
    a computer main body;
    a cover member, closeably installed at the computer main body, with a display for displaying an image;
    a first antenna, installed at the cover member;
    a second antenna, installed at one of the computer main body and the cover member; and
    a switch selectively switching at least one of the first and second antennas to a predetermined RF circuit module according to an opening state of the cover member;
    a sensor, installed at one of the computer main body and cover member, detecting said opening state of the cover member; and
    a controlling portion for controlling a connection state of the switch with respect to the first and second antennas according to opening state information output from the sensor;
    wherein electric waves are communicated by at least one of said first antenna and said second antenna in any opening state of the cover member.

5. The notebook computer as claimed in claim 4, wherein the first antenna is a dipole antenna capable of protruding above or retreating into the cover member.

6. The notebook computer as claimed in claim 4, wherein the second antenna is a strip line antenna installed in the main body.

7. A notebook computer comprising:
    a computer main body;
    a cover member, closeably installed at the computer main body, with a display for displaying an image;
    a first antenna, installed at the cover member;
    a second antenna, installed at one of the computer main body and the cover member;
    a switch selectively switching at least one of the first and second antennas to a predetermined RF circuit module according to an opening state of the cover member; and
    a switch button elastically protruding and retreating as the cover member is open and closed, respectively, so that one of the first antenna and the second antenna is connected to the switch;
    wherein electric waves are communicated by at least one of said first antenna and said second antenna in any opening state of the cover member.

* * * * *